US010949853B2

(12) United States Patent
Manoharan et al.

(10) Patent No.: US 10,949,853 B2
(45) Date of Patent: Mar. 16, 2021

(54) SYSTEMS AND METHODS FOR PROVIDING CONCURRENT DATA LOADING AND RULES EXECUTION IN RISK EVALUATIONS

(71) Applicant: PAYPAL, INC., San Jose, CA (US)

(72) Inventors: Srinivasan Manoharan, San Jose, CA (US); Vinesh Poruthikottu Chirakkil, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/183,682

(22) Filed: Nov. 7, 2018

(65) Prior Publication Data
US 2020/0143376 A1 May 7, 2020

(51) Int. Cl.
*G06Q 20/40* (2012.01)
(52) U.S. Cl.
CPC ................ *G06Q 20/4016* (2013.01)
(58) Field of Classification Search
CPC .................................................. G06Q 20/4016
See application file for complete search history.

(56) References Cited

U.S. PATENT DOCUMENTS

| 5,822,760 | A  | * | 10/1998 | Yoshizawa | G06F 12/0862 |
|---|---|---|---|---|---|
| | | | | | 711/137 |
| 6,629,102 | B1 | * | 9/2003 | Malloy | G06F 16/284 |
| 2002/0191545 | A1 | * | 12/2002 | Pieda | H04L 45/245 |
| | | | | | 370/238 |
| 2007/0233450 | A1 | * | 10/2007 | Papaefstathiou | G06F 30/20 |
| | | | | | 703/20 |
| 2012/0197781 | A1 | * | 8/2012 | Valetutti | G06Q 20/4016 |
| | | | | | 705/38 |
| 2013/0125097 | A1 | * | 5/2013 | Ebcioglu | G06F 12/0875 |
| | | | | | 717/136 |
| 2014/0357295 | A1 | * | 12/2014 | Skomra | G06Q 10/0833 |
| | | | | | 455/456.1 |
| 2015/0039512 | A1 | * | 2/2015 | Adjaoute | G06Q 20/4016 |
| | | | | | 705/44 |

(Continued)

OTHER PUBLICATIONS

Siti Hafizah Ab. Hamid; Mohd Hairul Nizam M. Nasir; Wong Yew Ming; and Hazrina Hassan; "Improving Response Time of Authorization Process of Credit Card System Using Multi-Threading and Shared-Memory Pool Techniques;" 2008; Journal of Computer Science, Science Publications (Year: 2008).*

(Continued)

*Primary Examiner* — Elda G Milef
*Assistant Examiner* — Raven E Zeer
(74) *Attorney, Agent, or Firm* — Haynes and Boone LLP

(57) ABSTRACT

Methods and systems are presented for providing concurrent data retrieval and risk processing while evaluating a risk source of an online service provider. Upon receiving a request to evaluate the risk source, a risk analysis module may initiate one or more risk evaluation sub-processes to evaluate the risk source. Each risk evaluation sub-process may require different data related to the risk source to perform the evaluation. The risk analysis module may simultaneously retrieve the data related to the risk source and perform the one or more risk evaluation sub-processes such that the risk analysis module may complete a risk evaluation sub-process whenever the data required by the risk evaluation sub-process is made available.

20 Claims, 5 Drawing Sheets

(56) References Cited

U.S. PATENT DOCUMENTS

| | | | | |
|---|---|---|---|---|
| 2015/0046332 A1* | 2/2015 | Adjaoute | ............... | G06N 20/00 705/44 |
| 2015/0269579 A1* | 9/2015 | Subramanian | ..... | G06Q 20/0855 705/44 |
| 2016/0063502 A1* | 3/2016 | Adjaoute | ........... | G06Q 20/4016 705/44 |
| 2016/0086185 A1* | 3/2016 | Adjaoute | ........... | G06Q 20/4016 705/44 |
| 2017/0300911 A1* | 10/2017 | Alnajem | ............ | G06Q 10/0635 |
| 2018/0121323 A1* | 5/2018 | Tucker | ................ | G06F 11/3664 |
| 2018/0275913 A1* | 9/2018 | Mitkar | .................. | G06F 3/065 |
| 2018/0285116 A1* | 10/2018 | Vembu | ................ | G06F 12/0866 |
| 2019/0026744 A1* | 1/2019 | Yang | ................. | G06Q 20/4016 |

OTHER PUBLICATIONS

Nurul Huda Binti Ahmad Zahari; "A Security Payment Model for Financial Payment Using Mykad" Apr. 2011, Universiti Tun Hussein Onn Malaysia (Year: 2011).*

Mucahit Gundebahar; and Sinem Zeynep Bastas; "Periodic Transaction Processing Architecture with High Performance in Financial Systems" 2016; IEEE (Year: 2016).*

\* cited by examiner

SYSTEMS AND METHODS FOR PROVIDING CONCURRENT DATA LOADING AND RULES EXECUTION IN RISK EVALUATIONS

BACKGROUND

The present specification generally relates to performing risk evaluations for electronic transaction requests, and more specifically to, improving the performance of a rule engine in performing the risk evaluations according to various embodiments of the disclosure.

RELATED ART

Today, an online service provider (e.g., an online bank, an e-commerce retail store, etc.) that provides online services to users may receive millions of online transaction requests each day. In addition to providing adequate services to the users, the entities also need to prevent unauthorized access to user accounts. For example, malicious users are known to use various tactics, such as phishing, man-in-the-middle attacks, or other security intrusion tactics, to obtain credentials associated with user accounts, and perform unauthorized transactions using those user accounts. In these instances, the entities need to differentiate unauthorized requests from authorized ones such that the user accounts are protected from unauthorized access and use. For example, the entities may deny requests that are determined to be possibly unauthorized. Furthermore, by denying the unauthorized requests, more processing power may be spent on processing the authorized requests, thus improving the service performance and quality for the legitimate users, while reducing the amount of computational power needed for processing and then remedying unauthorized requests.

Conventionally, rule engines may be used to determine, in real-time, whether a received transaction request is possibly an unauthorized or fraudulent transaction request. However, as rule engines become more complicated having to take into account a large number of different scenarios, they become inefficient. For example, some rule engines may require a large amount of data related to the transaction request in order to make such a determination. While some of the data may be obtained directly from the transaction request or from an internal source, other data may require retrieval from an external source, which causes delay in the authorization determination process and affects service performances to end users. Thus, there is a need for improving the performances of rule engines.

Figure 1:
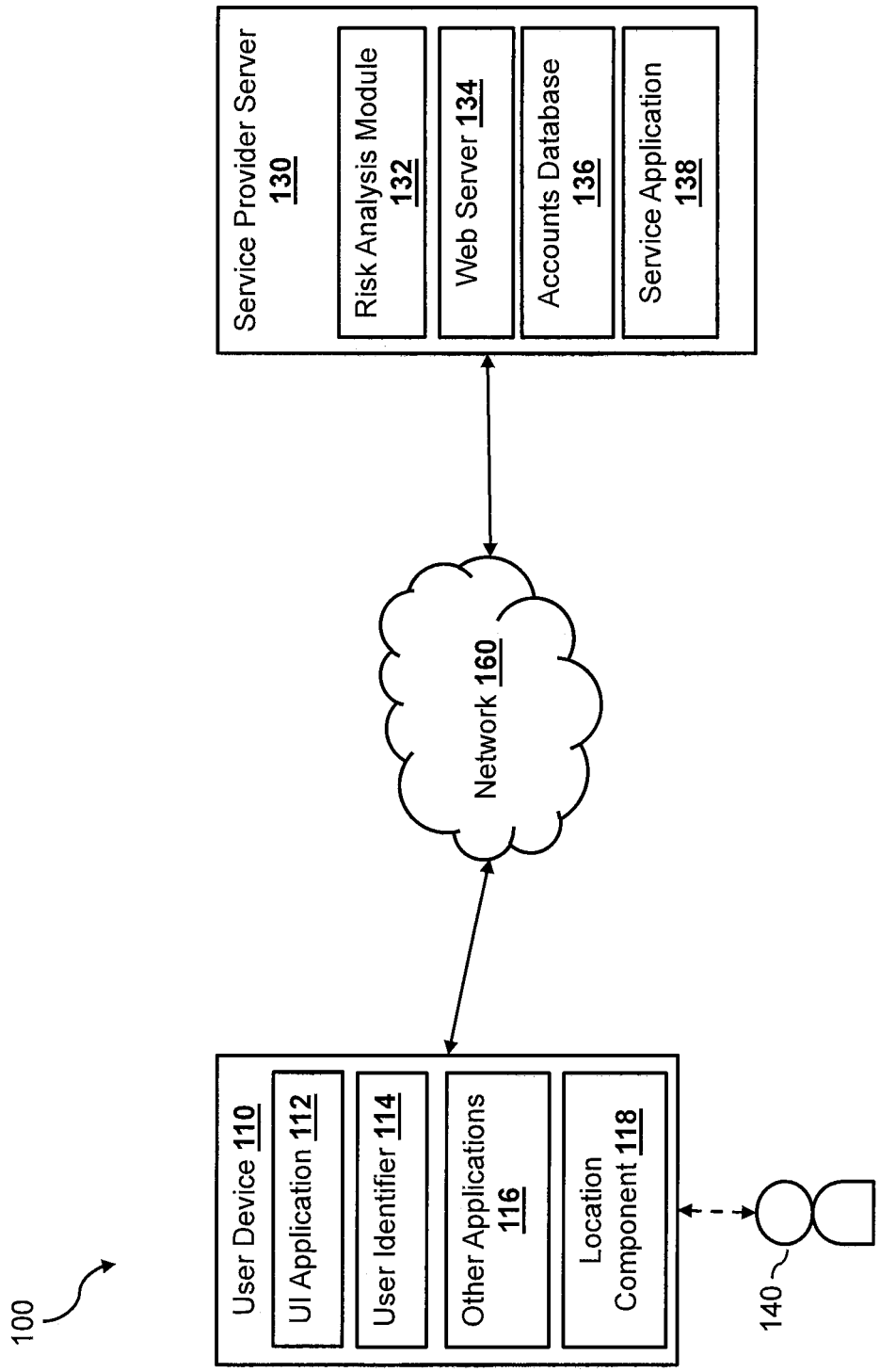
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing concurrent data retrieval and risk processing while evaluating a risk source of an online service provider. In various embodiments, the term "risk source" as used herein, may refer to a person and/or a device that may access resources (e.g., a computer server) of the online service provider. The risk source may be associated with (or triggered from) a request to access a resource of the online service provider. Examples of such requests may include a request to log in to an account of the online service provider, a request to access data associated with an account of the online service provider, or a request to perform a functionality (e.g., an electronic payment transaction, an electronic fund transfer, posting and/or receiving content, etc.) of the online service provider. Upon receiving the request, the online service provider may use a computer-based rule engine (may also be referred to simply as "rule engine") to evaluate the risk source.

The computer-based rule engine may comprise numerous risk evaluation sub-processes for evaluating the risk source and may be configured to provide an outcome based on the evaluation. In some embodiments, the outcome provided by the rule engine may be a binary outcome—an indication of whether the electronic transaction request is a legitimate request or a fraudulent request. In other embodiments, the outcome provided by the rule engine may be a score that indicates a likelihood that the electronic transaction request is a fraudulent request. The outcome may then be provided to a computer server of the online service provider such that the computer server may process (e.g., approve or deny) the online transaction request accordingly. Thus, the rule engine may often be required to evaluate the risk source in real-time (e.g., within a second from receiving such an online transaction request) such that the computer server may timely process the online transaction requests.

In some embodiments, one or more of the risk evaluation sub-processes may require a variety of information related to the risk source (e.g., information associated with the request, information associated with the device that initiated the request, information associated with the user account that the device tries to access, etc.) in order to evaluate the risk source. The information may include one or more of an Internet Protocol (IP) address of a source of the transaction request, a number of successful transactions within a predetermined period of time, a number of failed transactions within the predetermined period of time, a time, a browser type, a device type, an amount associated with the transaction, or a transaction type of the transaction. Some of the information required by the rule engine to generate the outcome may be extracted directly from the transaction request (e.g., IP address of the source of the transaction request, a payment amount, etc.), while some other information required by the rule engine may be retrieved from a device used to initiate the request, from an internal source (other servers or databases related to the rule engine that store relevant information related to a user account), or even from an external source (e.g., a credit bureau, etc.). Some of the information may be obtained directly from the transaction request itself, some other information may be obtained internally within the online service provider, and yet some other information may have to be retrieved from an external device, such as the user device that initiates the electronic transaction request or other external devices. As such, some of the information may be obtained quicker than other information.

Conventionally, even though different risk evaluation sub-processes may require different information for evaluating the risk source, all of the information related to the risk source (that may be needed by the rule engine) may be retrieved and loaded to the risk engine before the risk engine begins performing the risk evaluation sub-processes to evaluate the risk source. The risk engine may then perform each of the risk evaluation sub-processes in a selected path in series to evaluate the risk source. However, in some instances, not all of the loaded information is used by the rule engine to evaluate the risk source. For example, the rule engine may specify multiple potential evaluation paths for performing a risk evaluation process, where the different paths may include different sets of risk evaluation sub-processes that require different sets of information to evaluate the risk source. In some embodiments, the rule engine may follow a particular path to evaluate a risk source based on factors such as a transaction request type associated with the transaction request (e.g., whether the transaction request is a login request, an electronic fund transfer request, a financial source linking request, etc.), an amount associated with the transaction request, a device type that initiates the transaction request (e.g., whether the device is a mobile device), a location of the device when the transaction request, and many other factors. As such, if only a subset of the information retrieved and loaded into the rule engine is actually used by the rule engine, retrieving and loading data that is not used by the rule engine effectively wastes time and computing resources that could be applied elsewhere.

Furthermore, as discussed above, some of the information related to the risk source may be obtained more quickly (e.g., information that can be obtained and/or derived directly from the transaction request itself, information that can be obtained from an internal server) than others (e.g., information that has to be retrieved from other devices such as the device that initiated the transaction request and/or other external devices). As such, according to some embodiments of the disclosure, a risk evaluation system may configure the computer-based rule engine to start one or more of the risk evaluation sub-processes to evaluate the risk source while the information (e.g., data) related to risk source is being retrieved and loaded to improve the speed and performance efficiency of the risk evaluation process.

In some embodiments, upon receiving a request to evaluate a risk source (e.g., based on an electronic transaction request), the risk evaluation system may initiate (e.g., spawn) a first thread for obtaining and loading data related to the risk source that may be used by the rule engine for evaluating the risk source and initiate (e.g., spawn) a second thread for using a first risk evaluation sub-process associated with the rule engine to evaluate the risk source, where the first thread and the second thread may be performed in parallel (e.g., concurrently). The first risk evaluation sub-process may require first data related to the risk source (e.g., a network address of the device that initiates the electronic transaction request) to evaluate the risk source. As such, as the second thread is performing the first risk evaluation sub-process, the risk evaluation system may determine whether the first data is available (e.g., loaded in the rule engine). Since the first thread (for retrieving and loading data related to the risk source) is executed in parallel to the second thread, the first data may be retrieved and loaded as the second thread is performing the first risk evaluation sub-process. Thus, when it is determined that the first data is available (e.g., loaded to the rule engine), the second thread may continue to perform the first risk evaluation sub-process based on the first data. However, if it is determined that the first data is not yet available, the risk evaluation system may suspend the second thread (e.g., cause the second thread to idle, etc.).

Since the first thread (for retrieving and loading data related to the risk source) is executed in parallel to the second thread, the first thread may continue to retrieve and load data related to the risk source into the rule engine while the second thread is suspended (e.g., idling). As such, when the second thread is being suspended (e.g., idling), the risk evaluation system may detect whether the first data is available (e.g., loaded into the rule engine). In one example, the risk evaluation system may poll the availability of the first data according to a predetermined schedule (e.g., periodically such as every five nanoseconds, etc.). In another example, as the first thread obtains (e.g., retrieves) and loads data into the rule engine, the first thread may notify the risk evaluation system and/or other threads (e.g., the second thread) that the first data is loaded. Thus, when the risk evaluation system and/or the second thread determines that the first data is available based on the polling or by receiving a notification from the first thread, the risk evaluation system may cause the second thread to resume performing the first risk evaluation sub-process.

The second thread may then continue to perform the first risk evaluation sub-process based on the loaded first data. In some embodiments, when the first risk evaluation sub-process is completed, the risk evaluation system may then initiate (e.g., spawn) a third thread for performing a second risk evaluation sub-process (e.g., the risk evaluation sub-process subsequent to the first risk evaluation sub-process in a path of the rule engine). The second risk evaluation sub-process may require second data related to the risk source (e.g., a number of failed login attempts for the user account associated with the electronic transaction request) to evaluate to risk source. Similar to performing the first risk evaluation sub-process, the risk evaluation system may determine whether the second data is available (e.g., retrieved and loaded into the rule engine) as the third thread is performing the second risk evaluation sub-process. If the second data is available, the third thread may continue to perform the second risk evaluation sub-process based on the second data. If it is determined that the second data is not yet available, the risk evaluation system may suspend (e.g., cause the third thread to idle) the third thread until the second data is available.

In some embodiments, the risk evaluation system may determine whether the second risk evaluation sub-process is dependent on the first risk evaluation sub-process (e.g., whether the second risk evaluation requires any output produced by the first risk evaluation sub-process). When it is determined that the second risk evaluation sub-process is not dependent on the first risk evaluation sub-process, instead of initiating the third thread after the first risk evaluation sub-process is completed, the risk evaluation system may initiate (e.g., spawn) the third thread for performing the second risk evaluation sub-process while the second thread is being executed or while the second thread is suspended (e.g., idling). As such, the risk evaluation sub-processes may not need to be performed in serial, but may be performed in parallel as well. Furthermore, since different data may be retrieved and/or loaded at different times, a risk evaluation sub-process (e.g., the second risk evaluation sub-process) that was started after another risk evaluation sub-process (e.g., the first risk evaluation sub-process) may be completed first.

Some of the risk evaluation sub-processes may be dependent on outputs produced by other risk evaluation sub-processes, such that these risk evaluation sub-processes may not be performed in parallel (e.g., concurrently). Furthermore, the outputs of one or more risk evaluation sub-processes may be depended upon or used by the risk evaluation system to select the path in the rule engine for evaluating the risk source. For example, the rule engine may include a junction that divides a branch of the rule engine into two or more sub-branches. The decision to follow which sub-branch (e.g., the path) for evaluating the risk source may depend on the output of one or more of the risk evaluation sub-processes. In one example, the risk evaluation system may determine which sub-branch to follow at a junction based on whether the device that initiates the electronic transaction request is a mobile device.

As such, to further enhance the speed and performance of the rule engine, the risk evaluation system may configure the first thread to retrieve and load data related to the risk source according to a priority order that favors data that is required by risk evaluation sub-processes for producing output that is either (1) depended upon by other risk evaluation sub-processes and/or (2) depended upon by the risk evaluation system to select a path for evaluating the risk source. Thus, as more data is retrieved and loaded into the rule engine, the risk evaluation system may be able to initiate additional threads for performing risk evaluation sub-processes in parallel and eliminate paths (e.g., sub-branches) that will not be followed for evaluating the risk source. The risk evaluation system may further provide feedback (e.g., which sub-branch is eliminated) to the first thread such that the first thread may determine which data is no longer required for evaluating the risk source, and may stop retrieving and/or loading the data that is no longer required for evaluating the risk source. This way, the first thread can use the resources more efficiently in retrieving and loading data that is more likely to be required for evaluating the risk source.

FIG. 1 illustrates an electronic transaction system 100 according to one embodiment of the disclosure within which the risk evaluation system may be implemented. The electronic transaction system 100 includes a service provider server 130 and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to a user account to conduct account services or conduct electronic transactions (e.g., electronic payment transactions, purchasing and/or selling of items, online banking services, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions with the service provider server 130 over the network 160. In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one user identifier 114, which may be implemented, for example, as operating system registry entries, cookies associated with the user interface application 112, identifiers associated with hardware of the user device 110 (e.g., a media control access (MAC) address), or various other appropriate identifiers. The user identifier 118 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 114 may be passed with a user login request to the service provider server 130 via the network 160, and the user identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The service provider server 130, in one embodiment, may be maintained by a transaction processing entity or an online service provider, which may provide processing for electronic transactions for the user 140 of user device 110. As such, the service provider server 130 may include a service application 138, which may be adapted to interact with the user device 110 over the network 160 to facilitate the electronic services offered by the service provider server 130. In one example, the service provider server 130 may be provided by PayPal®, Inc. of San Jose, Calif., USA.

In some embodiments, the service application 138 may include a payment processing application (not shown) for processing purchases and/or payments for electronic transactions between a user and a merchant. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

In various embodiments, the service provider server includes a risk analysis module 132 that is configured to determine whether to authorize or deny an incoming electronic transaction request from the user device 110. The request may be a log-in request, an electronic fund transfer request, a request for adding an additional funding source, or other types of requests associated with the variety of services offered by the service provider server 130. As such, when a new request is received at the service provider server 130 (e.g., by the web server 134), the risk analysis module 132 may analyze (or evaluate) the a risk source associated with the request (e.g., the device 110, the person 140, etc.) and determine whether the request is possibly an unauthorized/fraudulent request based on information available to the risk analysis module. The risk analysis module 132 may transmit an indication of whether the request is possibly an unauthorized/fraudulent request to the web server 134 and/or the service application 138 such that the web server 134 and/or the service application 138 may process (e.g., approve or deny) the request based on the indication.

The service provider server 130, in one embodiment, may be configured to maintain one or more user accounts in an account database 136, each of which may include account information associated with one or more users (e.g., the user 140 associated with user device 110). The user 140 may be an individual person, a group of people, a community, an organization and/or a business entity. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the risk analysis module 132 to determine whether to authorize or deny a request associated with the user account. In certain embodiments, account information also includes user purchase profile information such as account funding options and payment options associated with the user, payment information, receipts, and other information collected in response to completed funding and/or payment transactions.

User purchase profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

Figure 2:
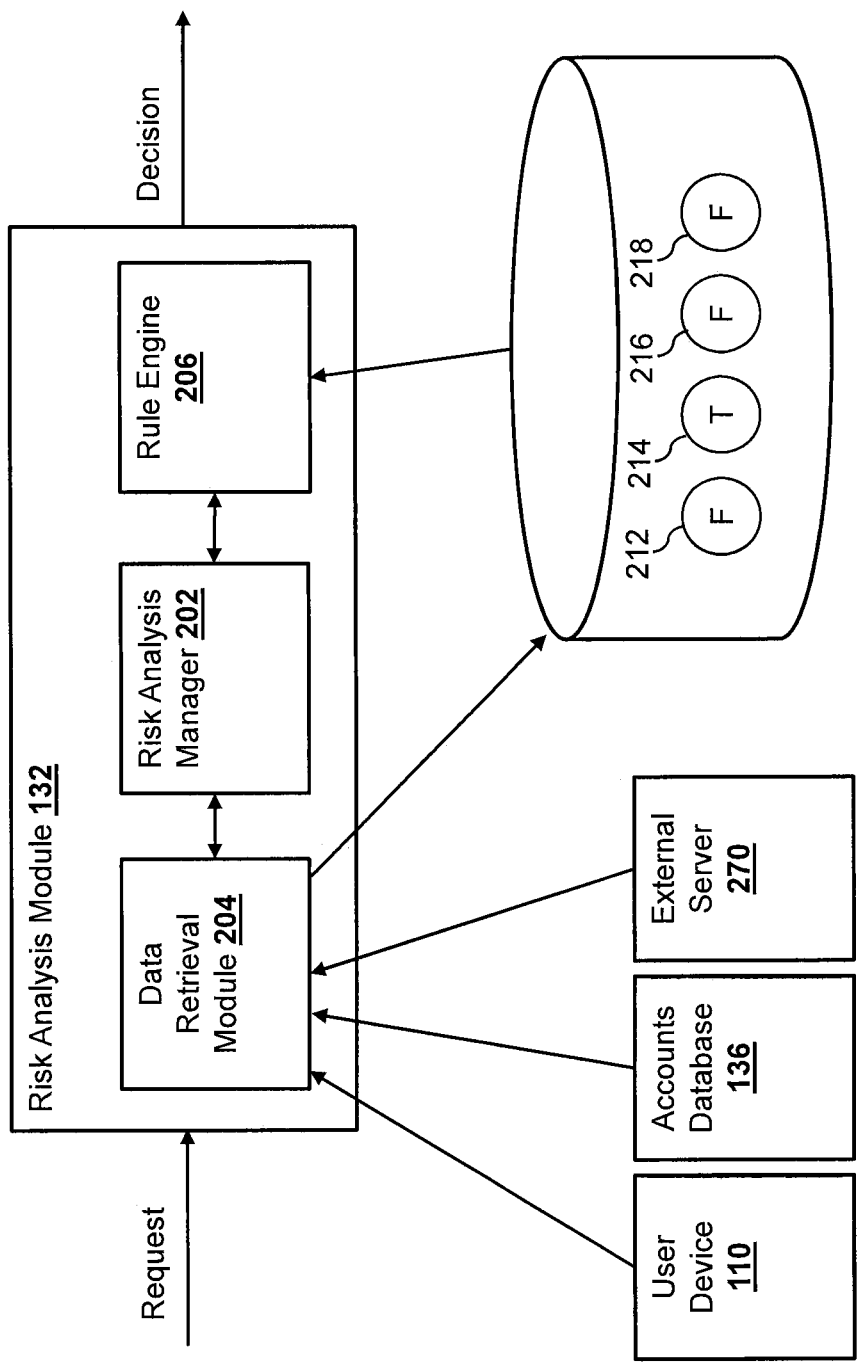
FIG. 2 is a block diagram illustrating a risk analysis module according to an embodiment of the present disclosure.

FIG. 2 illustrates a block diagram of the risk analysis module 132 according to an embodiment of the disclosure. The risk analysis module 132 includes a risk analysis manager 202, a data retrieval module 204, and a rule engine 206. Upon receiving a request to evaluate a risk source (e.g., triggered from an electronic transaction request, where the request can be a direct or an indirect request), the risk analysis manager 202 may initiate a thread for performing one or more risk evaluation sub-processes of the rule engine 206 and may initiate another thread for the data retrieval module 204 to obtain and load data into the rule engine 206, where the two threads are executed in parallel. The data retrieval module 204 may obtain and/or retrieve data related to the risk source from one more sources, such as the user device 110 (at which the electronic transaction request is initiated), other internal modules of the service provider server 130 such as the accounts database 136, and/or an external server 270 external to the service provider server 130. The risk analysis manager 202 may continue to initiate additional threads for performing different risk evaluation sub-processes of the rule engine 206 while the data retrieval module 204 is obtaining and/or loading data related to the risk source. When the rule engine completes performing all of the risk evaluation sub-processes for evaluating the risk source, the risk analysis module 132 may output a decision indicating a likelihood of whether the electronic transaction request is an unauthorized/fraudulent request. The output may be transmitted to other modules of the service provider server 130, such as the web server 134 and/or the service application 138, such that these other modules may process (e.g., approve or deny) the electronic transaction request accordingly.

Figure 3:
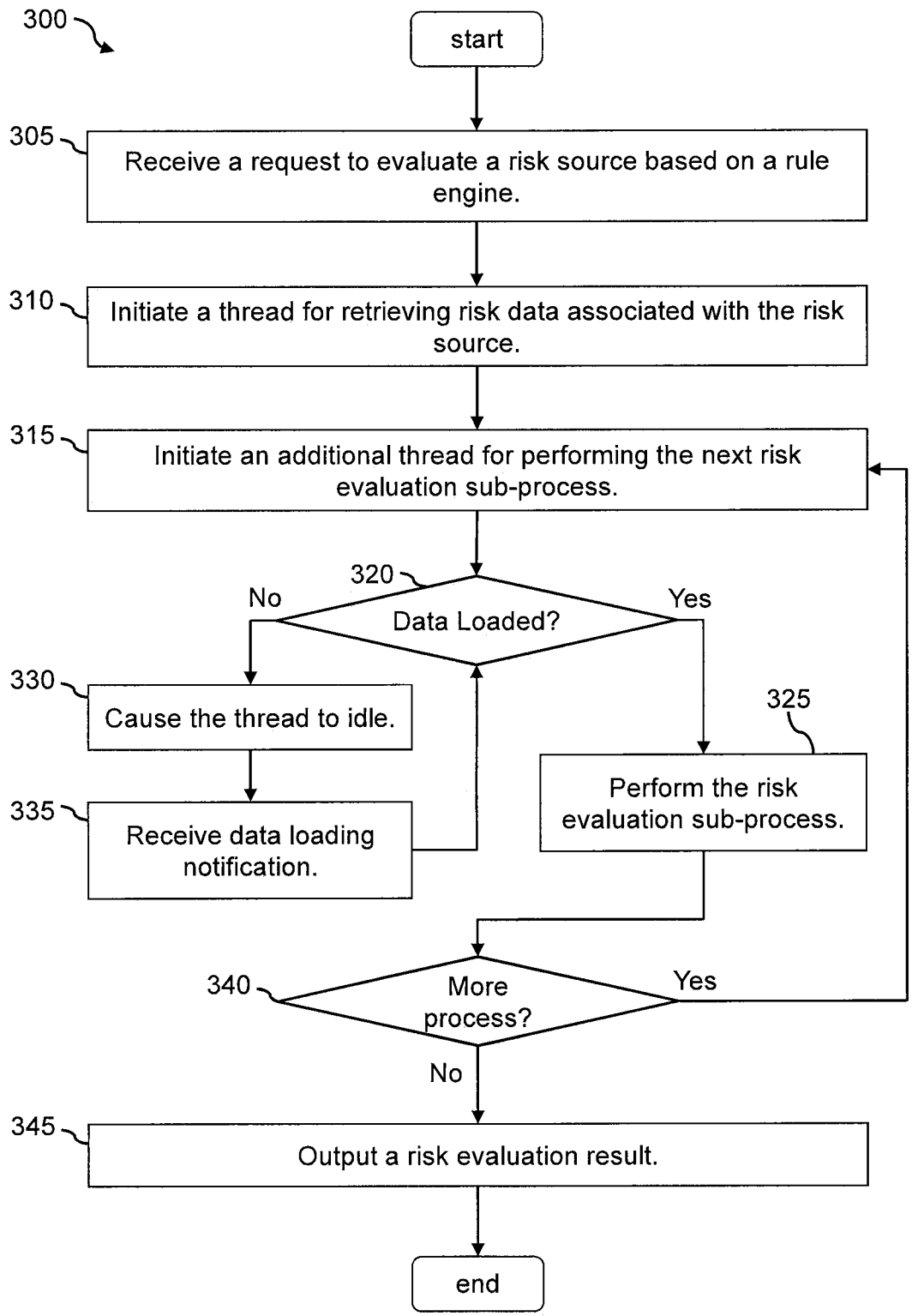
FIG. 3 is a flowchart showing a process of performing risk evaluation on a risk source according to an embodiment of the present disclosure.

FIG. 3 illustrates a process 300 for evaluating a risk source according to an embodiment of the disclosure. In some embodiments, the process 300 may be performed by the risk analysis module 132 of the service provider server 130. The process 300 begins by receiving (at step 305) a request to evaluate a risk source based on a computer-based rule engine. For example, the request to evaluate the risk source may be received from the web server 134 and/or the service application 138 when the web server 134 and/or the service application 138 receives an electronic transaction request from a user device, such as the user device 110. The electronic transaction request may be a login request for logging in to a user account, an electronic payment request for performing a payment using the user account, a request to purchase an item from an e-commerce website, a request to access content, or any other requests for services provided by the service provider server 130. The risk source may include the device (e.g., the user device 110) and or the person (e.g., the user 140) associated with the electronic transaction request.

The process 300 then initiates (at step 310) a thread for retrieving risk data associated with the risk source. For example, the risk analysis manager 202 may initiate a first thread for the data retrieval module 204 to obtain and load data related to the risk source into the rule engine 206. In some embodiments, the risk analysis manager 202 may instantiate a data object (e.g., data objects 212-218) for each data that the data retrieval module 204 may obtain for evaluating the risk source. Each data object may include a field for storing the corresponding data and a flag indicating whether the data is loaded and available to be used by the rule engine 206. When the risk analysis manager 202 instantiates the data objects 212-218, the risk analysis manager 202 may assign nil to the data field and assign a value (e.g., false) to the flag indicating that the data is not yet available to be used. The first thread may begin to obtain and/or retrieve data that may be used by the rule engine 206 to evaluate the risk source.

As discussed above, the rule engine 206 may include multiple paths that the risk analysis module 132 may traverse to evaluate the risk source. Each of the multiple paths may include a set of risk evaluation sub-processes (which may require a set of data related to the risk source) for evaluating the risk source. As will be described in more detail below, each sub-process may require data associated with one or more data objects (e.g., the data objects 212-218). Data from one data object may be required by multiple sub-processes in some instances. In some embodiments, the first thread may begin obtaining and/or retrieving data related to the risk source that may be required by all of the risk evaluation sub-processes of the rule engine 206.

Figure 4:
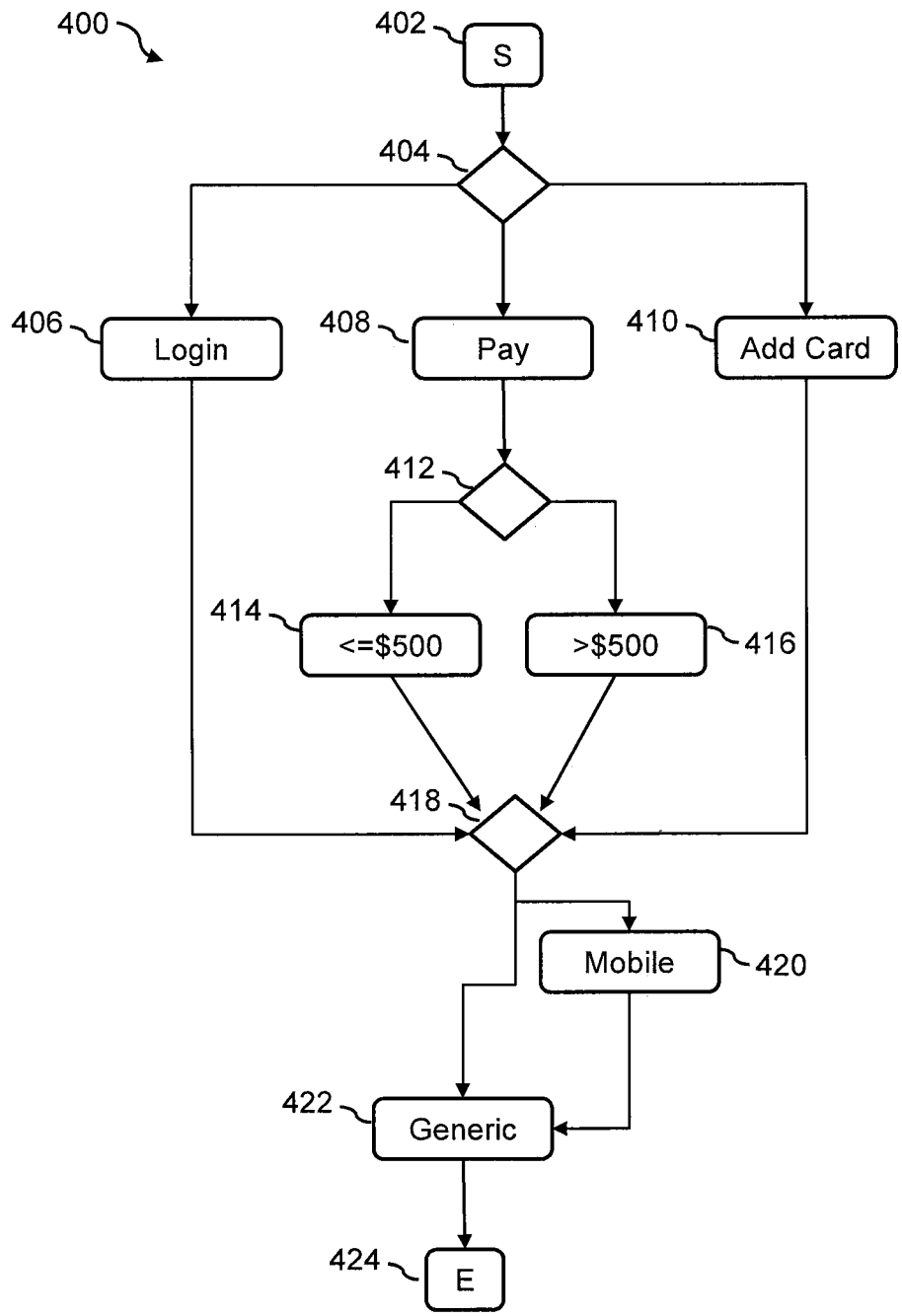
FIG. 4 illustrates an exemplary syntax tree according to an embodiment of the present disclosure.

FIG. 4 illustrates a syntax tree 400 that shows exemplary possible paths of a rule engine according to an embodiment of the disclosure. As shown, the syntax tree 400 includes a start node 402 and an end node 424. Each of the nodes (other than the start node 402 and the end node 424) may be associated with a risk evaluation sub-process. Each of those nodes may require different data related to the risk source to perform the corresponding risk evaluation sub-process.

When a risk source is being evaluated, the rule engine 206 begins the evaluation at the start node 402. The start node 402 is connected to only one node 404, so the rule engine 206 may continue along the path to traverse the node 404 and perform the risk evaluation sub-process associated with the node 404. The node 404 is connected to three different sub-branches, that is, the syntax tree 400 branches out to three different paths from the junction node 404. In some embodiments, at the junction node 404, the rule engine 206 may use information (e.g., data) related to the risk source (or an output from the risk evaluation sub-process associated with the junction node 404) to determine which of the three paths to follow. Based on the data and/or the output from the risk evaluation sub-process, the rule engine 206 may take a path that leads to the node 406, a path that leads to the node 408, or a path that leads to the node 410. In this example, the rule engine 206 may determine which path to follow based on whether the transaction request is a login request, a payment transaction request, or a request to add a funding source to a user account. For example, when the risk evaluation sub-process associated with the node 404 determines that the electronic transaction request is a login request, the rule engine 206 may take the path that leads to the node 406. The determination that the rule engine 206 is taking the path that leads to the node 406 may mean that the rule engine 206 will not traverse at least a portion of the other paths (e.g., the paths that lead to the node 408 and 410).

After evaluating the process request under the node 406 (e.g., performing the risk evaluation sub-process associated with the node 406), the path leads to the node 418. Similar to the node 404, the junction node 418 is connected to multiple sub-branches. In this example, the node 418 branches out to two paths: a path that leads to a node 420 and a path that leads to a node 422. As such, the rule engine 206 may use data related to the risk source and/or the output from a risk evaluation sub-process associated with the node 418 to determine which of the two paths to follow. The rule engine may perform the risk evaluation sub-process associated with the node 418. Based on the data and/or the output from the risk evaluation sub-process associated with the node 418, the rule engine 206 may take a path that leads to the node 420 or a path that leads to the node 422. In this example, the rule engine 206 may determine which path to follow based on whether the electronic transaction request is initiated from a mobile device or not. When it is determined that the electronic transaction request is not initiated from a mobile device, the rule engine 206 may take the path that leads to the node 422, and perform the risk evaluation sub-process associated with the node 422. The rule engine 206 then reaches the end node 424. At the end node, the rule engine 206 may generate an outcome based on the evaluation (e.g., the risk evaluation sub-processes) performed along the path that traverses the nodes 402, 404, 406, 418, 422, and 424.

On the other hand, if it is determined that the electronic transaction request is generated from a mobile device, the rule engine 206 may take the path that leads to the node 420 (and perform the risk evaluation sub-process associated with the node 420), which then reverts back to the node 422 (where the rule engine performs the risk evaluation sub-process associated with the node 422). The path then leads to the end node 424, at which point the rule engine 206 may generate an outcome based on the evaluation performed along the path (e.g., risk evaluation sub-processes) that traverses the nodes 402, 404, 406, 418, 420, 422, and 424.

Referring back to the node 404, when it is determined that the transaction request is a payment transaction request, the rule engine 206 may take the path that leads to the node 408 and may perform the risk evaluation sub-process associated with the node 408. After the node 408, the path then reaches the node 412, which connects to two different paths (one that leads to the node 414 and another one that leads to the node 416). As such, the rule engine 206 may perform the risk evaluation sub-process associated with the node 412, and may use data related to the transaction request (and/or the output from the risk evaluation sub-process associated with the node 412) to determine which of the two paths to follow. Based on the data and/or the output from the risk evaluation sub-process associated with the node 412, the rule engine 206 may take a path that leads to the node 414 or a path that leads to the node 416. In this example, the rule engine 206 may determine which path to follow at the junction 412 based on whether the payment transaction request involves an amount that is larger than $500 (or some other threshold amount) or not. When it is determined that the payment transaction request involves an amount larger than $500, the rule engine 206 may take the path that leads to the node 416, which leads to the node 418. Thus, the rule engine 206 may perform the risk evaluation sub-process associated with the node 416 and then perform the risk evaluation sub-process associated with the node 418.

The rule engine then performs similar processes as described above before reaching the end node 424, at which point, the rule engine may generate an outcome based on evaluation (e.g., the risk evaluation sub-processes) performed either along the path that traverses the nodes 402, 404, 408, 412, 416, 418, 422, and 424 or the path that traverses the nodes 402, 404, 408, 412, 416, 418, 420, 422, and 424.

On the other hand, if it is determined that the payment transaction request involves an amount that is less than or equal to $500 (or some other threshold amount), the rule engine 206 may take the path that leads to the node 414, which leads to the node 418. The rule engine 206 may perform the risk evaluation sub-processes associated with the nodes 414 and 418. The rule engine 206 may then perform similar processes as described above before reaching the end node 424, at which point, the rule engine may generate an outcome based on evaluations (e.g., the risk evaluation sub-processes) performed either along the path that traverses the nodes 402, 404, 408, 412, 414, 418, 422, and 424 or the path that traverses the nodes 402, 404, 408, 412, 414, 418, 420, 422, and 424.

Referring back to the node 404, when it is determined that the electronic transaction request is a request for adding an additional funding source, the rule engine 206 may take the path that leads to the node 410, which leads to the node 418. The rule engine 206 may perform the risk evaluation sub-processes associated with the nodes 410 and 418, and may then performs a similar process as described above before reaching the end node 424, at which point, the rule engine may generate an outcome based on evaluations (e.g., the risk evaluation sub-processes) performed either along the path that traverses the nodes 402, 404, 410, 418, 422, and 424 or the path that traverses the nodes 402, 404, 410, 418, 420, 422, and 424.

As such, the first thread may be configured to obtain and/or retrieve data related to the risk source that is required by the nodes 404-422. The data may include one or more of an Internet Protocol (IP) address of the device (e.g., the device 110) that initiates the electronic transaction request, a number of successful transactions within a predetermined period of time for a user account associated with the request, a number of failed transactions within the predetermined period of time for the user account, a time, a browser type used to initiate the electronic transaction request, a device type of the device 110, an amount associated with the electronic transaction request, a transaction type of the transaction (e.g., whether it is a login request, a payment transaction request, a request to add an additional financial source, etc.), or any type of data related to the risk source. As discussed herein, some of the information, such as the transaction type associated with the electronic transaction request may be obtained and/or derived from the electronic transaction request itself. Some of the information, such as a number of successful transactions within a predetermined period of time for the user account, may be obtained from an internal source, such as the account database 136, the web server 134, and/or the service application 138. Some of the information, such as a browser type or a device type of the device that initiates the electronic transaction request, may be retrieved from the device that initiates the electronic transaction request (e.g., the user device 110). Yet, some of the information, such as a credit score of a user associated with the user account, may be obtained from an external server (e.g., the external server 270). As such, the first thread may obtain and/or retrieve different data at different rates (e.g., may obtain some data faster than other data). As the first thread obtains and/or retrieves data related to the risk source, the first thread may load the data in the corresponding data object and may set the flag to another value (e.g., true) to indicate that the data is available.

Referring back to FIG. 3, the process 300 then initiates (at step 315) an additional thread for performing the next risk evaluation sub-process. For example, before the first thread finishes obtaining all of the data related to the risk source, the risk analysis manager 202 may initiate a second thread for performing the next risk evaluation sub-process for evaluating the risk source, such that the first thread and the second thread may be executed in parallel (e.g., concurrently). As illustrated by the syntax tree 400, there are eight potential paths for evaluating the risk source according to the rule engine 206. However, to evaluate any risk source, the rule engine 206 may always start at the node 404. As such, the risk analysis manager 202 may initiate the second thread for performing the risk evaluation sub-process associated with the node 404 of the rule engine 206. The risk evaluation sub-process associated with the node 404 may require certain data related to the risk source to evaluate the risk source. Thus, the process 300 then determines (at step 320) whether the data required by the risk evaluation sub-process is available, and if it is available, the process 300 performs (at step 325) performs the risk evaluation sub-process. However, if it is determined at the step 320 that the data is not available, the process 300 causes (at step 330) the thread to idle. When the process 300 receives (at step 335) a data loading notification, the process may revert back to the step 325 to determine whether the data is available.

For example, the risk analysis manager 202 and/or the second thread may determine whether the required data is available (e.g., loaded into the corresponding data object (e.g., the data object 212) for use by the rule engine 206). In some embodiments, the risk analysis manager 202 and/or the second thread may determine whether the required data is available by checking the flag in the data object 212. When the flag of the data object 212 includes a value (e.g., "true") that indicates that the data is available, the second thread may continue to perform the risk evaluation sub-process associated with the node 404 based on the data stored in the data object 212. However, when the flag of the data object 212 includes a value (e.g., "false") that indicates that the data is unavailable, the risk analysis manager 202 may suspend the second thread. In some embodiments, suspending the second thread means causing the second thread to idle (e.g., without performing any substantive processes) while maintaining a current state (e.g., without removing any data associated with the second thread from the random access memory of the computing device such that the second thread can subsequently resume the risk evaluation sub-process at the point of the process when it was suspended).

The risk analysis manager 202 and/or the second thread may continue to check whether the data required by the risk evaluation sub-process associated with the node 404 is available. Different embodiments may use different techniques to check the data availability. In some embodiments, the risk analysis manager 202 and/or the second thread may check the flag of the data object 212 according to a predetermined schedule (e.g., every 0.5 nanoseconds, etc.). Thus, the risk analysis manager 202 and/or the second thread may determine that the data is available when the flag of the data object 212 has been changed to a value (e.g., "true") indicating that the data is available. In some embodiments, the first thread may be configured to send a notification to the risk analysis manager 202 and/or other threads such as the second thread indicating that data has been loaded to a data object. The notification may or may not indicate which data object that the data has been loaded. As such, in response to receiving the notification, the risk analysis manager 202 and/or the second thread may check the flag of the data object 212 to determine whether the data is now available. If the data is still not available, the risk analysis manager 202 and/or the second thread may check again after receiving another notification. If the data is now available, the risk analysis manager 202 may then cause the second thread to resume the risk evaluation sub-process based on the data loaded in the data object 212.

After the risk evaluation sub-process is completed, the process 300 determines (at step 340) whether there are more risk evaluation sub-processes to be performed. If it is determined that there are no more risk evaluation sub-processes to be performed, the process 300 outputs (at step 345) a risk evaluation result. On the other hand, if it is determined that there are more risk evaluation sub-processes to be performed, the process 300 reverts back to the step 315 to initiate an additional thread for performing the next risk evaluation sub-process. For example, referring back to FIG. 4, when the second thread completes the risk evaluation sub-process associated with the node 404, the risk analysis manager 202 may determine which of the three paths (that branches out from the node 404) to follow based on an output from the risk evaluation sub-process associated with the node 404. For example, the risk evaluation sub-process associated with the node 404 may provide an output that indicates whether the electronic transaction request is associated with a login request, an electronic payment request, or a request to add an additional funding source. When it is determined that the electronic transaction request is a login request, the risk analysis manager 202 may follow the path the leads to the node 406, and initiates a third thread for performing the risk evaluation sub-process associated with the node 406.

The risk evaluation sub-process associated with the node 406 may require other data related to the risk source (e.g., the data corresponding to the data object 214). Similar to performing the risk evaluation sub-process associated with the node 404, the risk analysis manager 202 and/or the third thread may determine whether the data is available by checking the flag in the data object 214. If it is determined that the data is available (e.g., the flag includes a value "T" indicating that the data is available), the third thread may continue to perform the risk evaluation sub-process associated with the node 406. The risk analysis manager 202 may continue to follow a path in the rule engine 206 (e.g., the path that includes the nodes 404, 406, 418, 420, and 422) to evaluate the risk source until it has traversed all of the nodes and has performed all of the risk evaluation sub-processes associated with the nodes along the path.

Based on the outputs of the risk evaluation sub-processes, the rule engine 206 may output a decision. In some embodiments, the decision provided by the rule engine 206 may be a binary outcome—an indication of whether the electronic transaction request is a legitimate request or a fraudulent request. In other embodiments, the decision provided by the rule engine 206 may be a score that indicates a likelihood that the electronic transaction request is a fraudulent request. The risk analysis module 132 may then provide the decision to the web server 134 and/or the service application 138 of the service provider server 130 such that the web server 134 and/or the service application 138 may process (e.g., approve or deny) the online transaction request based on or using the decision.

Thus, by concurrently performing the retrieval of data and the risk evaluation, the risk analysis module 132 may perform the risk evaluation sub-processes as the data is made available to the rule engine 206 (instead of waiting for all of the data to be completely retrieved and loaded), thereby improving the speed and performance efficiency of evaluating a risk of a risk source. In some embodiments, to further enhance the risk evaluation process, the risk analysis manager 202 may initiate additional threads for performing other risk evaluation sub-processes while one or more of the threads are suspended (e.g., idling). For example, when the second thread for performing the risk evaluation sub-process associated with the node 404 is suspended (e.g., idling and waiting for the data for the data object 212 to be available), the risk analysis manager 202 may look ahead in the rule engine 206 to determine whether any node(s) and corresponding risk evaluation sub-process(es) along a potential path for evaluating the risk source is independent of the output of the risk evaluation sub-process associated with the node 404. For example, based on the syntax tree 400, the risk analysis manager 202 may determine that it will traverse the node 422 regardless of which path it follows and that the risk evaluation sub-process associated with the node 422 is independent of other incomplete risk evaluation sub-processes in the rule engine 206. Thus, while the second thread is suspended, the risk analysis manager 202 may initiate an additional thread (e.g., a fourth thread) for performing the risk evaluation sub-process associated with the node 422. As such, the risk evaluation sub-processes may not need to be performed in serial, but may be performed in parallel as well. Furthermore, since different data may be retrieved and/or loaded at different times, the threads may begin performing (or continue to perform) the corresponding risk evaluation sub-processes as soon as the required data is made available (e.g., loaded into the corresponding data objects). As such a risk evaluation sub-process that was started after another risk evaluation sub-process may be completed first.

Furthermore, in some embodiments, to further enhance the speed and efficiency performance of the risk evaluation process, the risk analysis manager may configure the first thread to obtain and/or retrieve data in a particular order. As discussed above, the output of a risk evaluation sub-process may be depended upon or used by either by another risk evaluation sub-process and/or by the rule engine 206 to determine which path to follows. For example, referring to the syntax tree 400, the output of risk evaluation sub-process associated with the node 404 is used by the rule engine 206 to determine which of the three paths (leading to the node 406, the node 408, or the node 410) to follow, the output of the risk evaluation sub-process associated with the node 412 is used by the rule engine 206 to determine which of the two paths (leading to the node 414 or the node 416) to follow, and the output of the risk evaluation sub-process associated with the node 418 is used by the rule engine 206 to determine which of the two paths (leading to the node 420 or the node 422) to follow. As such, the data required by the risk evaluation sub-processes associated with the nodes 404, 412, and 418 may have a higher priority than data required by other risk evaluation sub-processes. In addition, among the nodes 404, 412, and 418, the rule analysis manager 202 may determine that the nodes 404 and 418 are part of all of the eight potential paths in the rule engine 206, while the node 412 is part of only two of the eight paths. As such, the risk analysis manager 202 may further give the data required by the risk evaluation sub-processes associated with the nodes 404 and 418 a higher priority than the data required by the risk evaluation sub process associated with the node 418. The risk analysis manager 202 may then configure the first thread to obtain and/or retrieve data according to the determined priority levels.

As the rule engine 206 continues to process risk evaluation sub-processes, the rule engine 206 may determine which of the potential paths in the syntax tree 400 is no longer possible for evaluating the risk source. For example, after performing the risk evaluation sub-process associated with the node 404, the rule engine 206 may determine to follow the path that leads to the node 406. The rule engine 206 may then determine that the paths that lead to the node 408 and the node 410 are no longer relevant for evaluating the risk source. As such, the data required by the risk evaluation sub-processes associated with the nodes along those paths (e.g., the nodes 408, 410, 412, 414, and 416) are not needed by the risk engine 206 for evaluating the risk source. In some embodiments, the risk analysis manager 202 may provide the information as a feedback to the first thread, and cause the first thread to stop obtaining/retrieving the data required by the risk evaluation sub-processes associated with the nodes 408, 410, 412, 414, and 416. This way, the first thread can focus on using the resources to obtain and/or retrieve data that is more likely to be used by the rule engine 206, instead of wasting the resources to obtain/retrieve data that will not be used by the rule engine 206.

Figure 5:
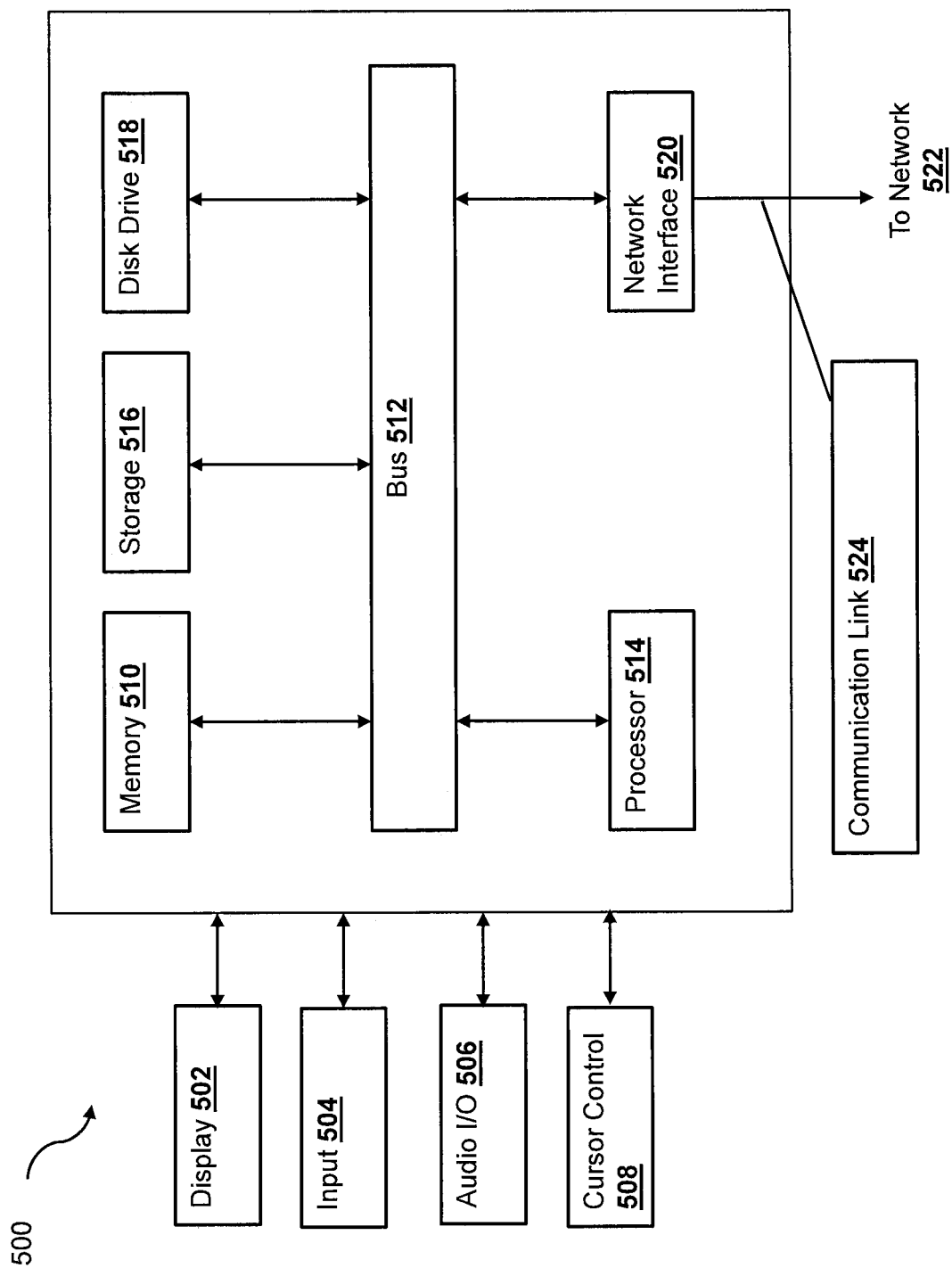
FIG. 5 is a block diagram of a system for implementing a device according to an embodiment of the present disclosure.

FIG. 5 is a block diagram of a computer system 500 suitable for implementing one or more embodiments of the present disclosure, including the service provider server 130 and the user device 110. In various implementations, the user device 110 may include a mobile cellular phone, personal computer (PC), laptop, wearable computing device, etc. adapted for wireless communication, and the service provider server 130 may include a network computing device, such as a server. Thus, it should be appreciated that the devices 110 and 130 may be implemented as the computer system 500 in a manner as follows.

The computer system 500 includes a bus 512 or other communication mechanism for communicating information data, signals, and information between various components of the computer system 500. The components include an input/output (I/O) component 504 that processes a user (i.e., sender, recipient, service provider) action, such as selecting keys from a keypad/keyboard, selecting one or more buttons or links, etc., and sends a corresponding signal to the bus 512. The I/O component 504 may also include an output component, such as a display 502 and a cursor control 508 (such as a keyboard, keypad, mouse, etc.). The display 502 may be configured to present a login page for logging into a user account or a checkout page for purchasing an item from a merchant. An optional audio input/output component 506 may also be included to allow a user to use voice for inputting information by converting audio signals. The audio I/O component 506 may allow the user to hear audio. A transceiver or network interface 520 transmits and receives signals between the computer system 500 and other devices, such as another user device, a merchant server, or a service provider server via network 522. In one embodiment, the transmission is wireless, although other transmission mediums and methods may also be suitable. A processor 514, which can be a micro-controller, digital signal processor (DSP), or other processing component, processes these various signals, such as for display on the computer system 500 or transmission to other devices via a communication link 524. The processor 514 may also control transmission of information, such as cookies or IP addresses, to other devices.

The components of the computer system 500 also include a system memory component 510 (e.g., RAM), a static storage component 516 (e.g., ROM), and/or a disk drive 518 (e.g., a solid state drive, a hard drive). The computer system 500 performs specific operations by the processor 514 and other components by executing one or more sequences of instructions contained in the system memory component 510. For example, the processor 514 can perform the risk evaluation functionalities described herein according to the process 300.

Logic may be encoded in a computer readable medium, which may refer to any medium that participates in providing instructions to the processor 514 for execution. Such a medium may take many forms, including but not limited to, non-volatile media, volatile media, and transmission media. In various implementations, non-volatile media includes optical or magnetic disks, volatile media includes dynamic memory, such as the system memory component 510, and transmission media includes coaxial cables, copper wire, and fiber optics, including wires that comprise the bus 512. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 500. In various other embodiments of the present disclosure, a plurality of computer systems 500 coupled by the communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a non-transitory memory; and
   one or more hardware processors coupled with the non-transitory memory and configured to read instructions from the non-transitory memory to cause the system to perform operations comprising:
   receiving a request to evaluate a risk source based on a computer-based rule engine, the computer-based rule engine being configured to execute a plurality of risk evaluation sub-processes, wherein each of the plurality of risk evaluation sub-processes evaluates the risk source based on corresponding risk data associated with the risk source;
   initiating a first thread for retrieving risk data associated with the risk source according to a first order;
   initiating a second thread for performing a first risk evaluation sub-process from the plurality of risk evaluation sub-processes to evaluate the risk source based on the computer-based rule engine, wherein the first risk evaluation sub-process is configured to evaluate the risk source based on a set of risk data according to a plurality of evaluation paths associated with the first risk evaluation sub-process;
   analyzing the plurality of evaluation paths associated with the first risk evaluation sub-process;
   determining, based on the analyzing, that first risk data from the set of risk data is required by the first risk evaluation sub-process to eliminate at least one of the plurality of evaluation paths for evaluating the risk source;
   generating a priority ranking for retrieving the set of risk data based at least in part on the determining that first risk data is required by the first risk evaluation sub-process to eliminate the at least one of the plurality of evaluation paths;
   causing the first thread to retrieve the set of risk data according to a second order different from the first order based on the priority ranking;
   providing the first risk data to the second thread;
   determining that the at least one of the plurality of evaluation paths is eliminated from evaluating the risk source by the first risk evaluation sub-process based on the first risk data;
   in response to determining that the at least one of the plurality of evaluation paths is eliminated, identifying a subset of the set of risk data associated with the at least one of the plurality of evaluation paths; and
   causing the first thread to abort retrieving the subset of the set of risk data.

2. The system of claim 1, wherein the operations further comprise executing the second thread in parallel with the first thread.

3. The system of claim 1, wherein the risk source is associated with an electronic transaction request initiated from a device, and wherein the first risk data comprises information associated with the device.

4. The system of claim 1, wherein the operations further comprise:
   in response to receiving the request, instantiating at least a first data object for the first risk data, wherein the first data object comprises a flag; and
   assigning, to the flag, a first value indicating that the first risk data is not available.

5. The system of claim 4, wherein the operations further comprise:
   retrieving, by the first thread, the first risk data;
   storing the first risk data in the first data object; and
   in response to retrieving the first risk data, assigning, to the flag of the first data object, a second value indicating that the first risk data is available.

6. The system of claim 5, wherein the operations further comprise in response to receiving a risk data request for the first risk data, determining that the first risk data is available based on the second value assigned to the flag of the first data object.

7. The system of claim 1, wherein the operations further comprise receiving a notification indicating that the first risk data is loaded from the first thread.

8. The system of claim 1, wherein the operations further comprise:
   determining that the first risk data is not available;

in response to determining that the first risk data is not available, causing the second thread to idle;

subsequent to causing the second thread to idle, determining that the first risk data is available; and in response to determining that the first risk data is available, causing the second thread to resume performing the first risk evaluation sub-process based on first risk data.

9. The system of claim 1, wherein the operations further comprise initiating a third thread for performing a second risk evaluation sub-process from the plurality of risk evaluation sub-processes.

10. The system of claim 9, wherein the operations further comprise:

determining that the second risk evaluation sub-process is independent from an output of the first risk evaluation sub-process, wherein the third thread is initiated while the second thread is executed based on the determining that the second risk evaluation sub-process is independent from the output of the first risk evaluation sub-process.

11. A method comprising:

receiving, by one or more hardware processors, a request to evaluate a risk source based on a computer-based rule engine, wherein the computer-based rule engine comprises a plurality of risk evaluation sub-processes, wherein each of the plurality of risk evaluation sub-processes evaluates the risk source based on one or more risk data associated with the risk source;

initiating, by the one or more hardware processors, a first thread for retrieving a set of risk data associated with the risk source according to a first order;

while the first thread is retrieving the set of risk data, initiating, by the one or more hardware processors, a second thread for performing a first risk evaluation sub-process from the plurality of risk evaluation sub-processes to evaluate the risk source based on the computer-based rule engine, wherein the first thread and the second thread are executed in parallel, and wherein the first risk evaluation sub-process is configured to evaluate the risk source according to one of a plurality of evaluation paths;

analyzing, by the one or more hardware processors, the plurality of evaluation paths associated with the first risk evaluation sub-process;

determining, by the one or more hardware processors and based on the analyzing, that first risk data from the set of risk data is required by the first risk evaluation sub-process to eliminate at least one of the plurality of evaluation paths for evaluating the risk source;

generating, by the one or more hardware processors, a priority ranking for retrieving the set of risk data based at least in part on the determining that first risk data is required by the first risk evaluation sub-process to eliminate the at least one of the plurality of evaluation paths;

causing, by the one or more hardware processors, the first thread to retrieve the set of risk data according to a second order different from the first order based on the priority ranking;

subsequent to causing the first thread to retrieve the set of risk data according to the second order, receiving, by the one or more hardware processors from the second thread, the risk data request for the first risk data;

determining, by the one or more hardware processors, that the first risk data is available;

in response to determining that the first risk data is available, providing, by the one or more hardware processors, the first risk data to the second thread;

causing, by the one or more hardware processors, the second thread to continue performing the first risk evaluation sub-process based on the first risk data;

determining, by the one or more hardware processors, that the at least one of the plurality of evaluation paths is eliminated from evaluating the risk source by the first risk evaluation sub-process based on the first risk data;

in response to determining that the at least one of the plurality of evaluation paths is eliminated, identifying a subset of the set of risk data associated with the at least one of the plurality of evaluation paths; and causing the first thread to abort retrieving the subset of the set of risk data.

12. The method of claim 11, further comprising:

in response to receiving the request, instantiating at least a first data object for the first risk data, wherein the first data object comprises a flag; and assigning, to the flag, a first value indicating that the first risk data is not available.

13. The method of claim 12, further comprising:

retrieving, by the first thread, the first risk data;

storing the first risk data in the first data object; and in response to retrieving the first risk data, assigning, to the flag of the first data object, a second value indicating that the first risk data is available.

14. The method of claim 13, further comprising determining that the first risk data is available based on the second value assigned to the flag of the first data object.

15. The method of claim 11, further comprising receiving a data loaded notification from the first thread indicating that the first risk data is available.

16. The method of claim 11, further comprising:

determining that the first risk data is not available; and in response to determining that the first risk data is not available, causing the second thread to idle.

17. The method of claim 16, further comprising:

while the second thread is idling, determining that the first risk data is available; and in response to determining that the first risk data is available, causing the second thread to resume performing the first risk evaluation sub-process based on the first risk data.

18. A non-transitory machine-readable medium having stored thereon machine-readable instructions executable to cause a machine to perform operations comprising:

receiving a request to evaluate a risk source based on a computer-based rule engine, the computer-based rule engine being configured to execute a plurality of risk evaluation sub-processes, wherein each of the plurality of risk evaluation sub-processes evaluates the risk source based on one or more risk data associated with the risk source;

initiating a first thread for retrieving risk data associated with the risk source according to a first order;

initiating a second thread for performing a first risk evaluation sub-process from the plurality of risk evaluation sub-processes to evaluate the risk source based on the computer-based rule engine, wherein the first risk evaluation sub-process is configured to evaluate the risk source based on a set of risk data according to a plurality of evaluation paths;

analyzing the plurality of evaluation paths associated with the first risk evaluation sub-process;

determining, based on the analyzing, that first risk data from the set of risk data is required by the first risk evaluation sub-process to eliminate at least one of the plurality of evaluation paths for evaluating the risk source before receiving, from the second thread, a risk data request for the first risk data;

generating a priority ranking for retrieving the set of risk data based at least in part on the determining that first risk data is required by the first risk evaluation sub-process to eliminate the at least one of the plurality of evaluation paths;

causing the first thread to retrieve the set of risk data according to a second order different from the first order based on the priority ranking;

receiving, from the second thread based on executing the first risk evaluation sub-process using the first risk data obtained by the first thread, an indication that the at least one of the plurality of evaluation paths is eliminated from evaluating the risk source by the first risk evaluation sub-process;

identifying second risk data from the set of risk data that is associated with the at least one of the plurality of evaluation paths; and in response to receiving the indication, instructing the first thread to abort retrieving the second risk data.

19. The non-transitory machine-readable medium of claim 18, wherein the operations further comprise initiating a third thread for performing a second risk evaluation sub-process from the plurality of risk evaluation sub-processes.

20. The non-transitory machine-readable medium of claim 19, wherein the operations further comprise:

determining that the second risk evaluation sub-process is independent from an output of the first risk evaluation sub-process, wherein the third thread is initiated based on the determining that the second risk evaluation sub-process is independent from the output of the first risk evaluation sub-process.

* * * * *